United States Patent [19]

McFarlane

[11] 4,118,881
[45] Oct. 10, 1978

[54] METHOD AND APPARATUS FOR THREADING WORMS ON FISHHOOKS

[76] Inventor: Douglas A. McFarlane, 140 S. Dolliver-#121, Pismo Beach, Calif. 93449

[21] Appl. No.: 775,059

[22] Filed: Mar. 7, 1977

[51] Int. Cl.² ............................................. A01K 97/00
[52] U.S. Cl. ............................................................. 43/4
[58] Field of Search ........................ 43/4, 44.2, 54.5 R

[56] References Cited

U.S. PATENT DOCUMENTS

| 2,423,899 | 7/1947 | Odgard | 43/4 |
| 2,880,545 | 4/1959 | Stadler | 43/44.2 |
| 2,948,979 | 8/1960 | Kulp | 43/4 |

FOREIGN PATENT DOCUMENTS 2,530,285  1/1977  Fed. Rep. of Germany ............... 43/4
625,699  9/1961  Italy ............................................. 43/4

*Primary Examiner*—Robert C. Watson
*Attorney, Agent, or Firm*—Clarence A. O'Brien; Harvey B. Jacobson

[57] ABSTRACT

Apparatus for threading worms and the like on fishhooks has a body member provided with a through hole arranged for receiving an end portion of a worm disposed extending along a surface of the body member adjacent the hole. A length of tubing is then inserted into the worm and subsequently placed cantilever fashion in a recess provided on the body member. The tubing supports a fishhook at the free end of the tubing, with a length of line attached to the hook being wrapped part of the way around the body member, and the worm is moved manually from the tubing onto the hook and line.

7 Claims, 10 Drawing Figures

METHOD AND APPARATUS FOR THREADING WORMS ON FISHHOOKS

BACKGROUND OF THE INVENTION

1. Field of the Invention

This invention relates generally to fishing aids, and particularly to a device for facilitating the operation of threading worms and like bait onto a fishhook and associated line or leader.

2. Description of the Prior Art

A popular manner of baiting a hook is to arrange a worm or like bait longitudinally over a hook and the line or leader associated with the hook. As can be appreciated, however, difficulties arise in so threading the worm, and accordingly various proposals have been made for simplifying the procedure. For example, U.S. Pat. No. 2,948,979, issued Aug. 16, 1960, to Kulp, discloses a baiting device which includes a rod on which a worm is initially threaded, and which receives the barbed end of a fishhook for carrying out a subsequent step of threading the worm from the rod onto the hook and associated line. Further, U.S. Pat. No. 2,423,899, issued July 15, 1947, to Adgard, discloses a bait-mounting needle provided with a tubular opening intended to receive the barb of a fishhook during a worm threading operation.

SUMMARY OF THE INVENTION

It is an object of the present invention to provide a worm threading appliance which assures the worm being held stationary during the threading operation.

It is another object of the invention to provide a worm threading appliance which simplifies an initial step of threading a longitudinal element into the worm to be threaded onto a fishhook.

These and other objects are achieved according to the present invention by providing apparatus having: a body member provided with a through hole arranged for receiving a worm, and also provided with a recess; and a longitudinally extending element selectively insertable into the worm received in the hole provided in the body member, and removably insertable into the recess provided in the body member together with the worm into which the element is inserted.

The body member is preferably a substantially rectangular block having a longitudinal extent, with the body member being further provided with a groove extending along the longitudinal extent of the block for receiving the worm during insertion of the element into the worm. The hole communicates with the groove. The block has longitudinally spaced end surfaces in which are provided slots arranged for receiving a length of fishing line. These slots are disposed substantially parallel to one another and in a plane parallel to that of the groove, but extend laterally of the groove, with the recess being parallel to and substantially coplanar with the slots.

The longitudinally extending member is advantageously a length of tubing having spaced end portions, one of which end portions is removably insertable into the recess provided in the body member. The other of the end portions forms an open end arranged for receiving a fishhook attached to the length of fish line received in the slots provided in the body member.

By the above arrangement, a portion of a worm can be initially inserted into the hole provided in the body member and laid longitudinally in the groove extending from the hole. In this manner, the worm can be held securely in the groove provided in the body member while the longitudinally extending element is inserted into the worm. Once the worm is entirely on the longitudinally extending element, the latter is placed in the recess provided in the body member so as to extend from the body member cantilever fashion, and a fishhook is inserted into the open free end of the longitudinally extending element. A line or leader attached to the fishhook is passed through the slots provided in the longitudinally spaced end surfaces of the body member so as to permit tightening of the length of line extending between the fishhook and the body member. The worm now can be moved easily from the longitudinally extending element over the fishhook and onto the line.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
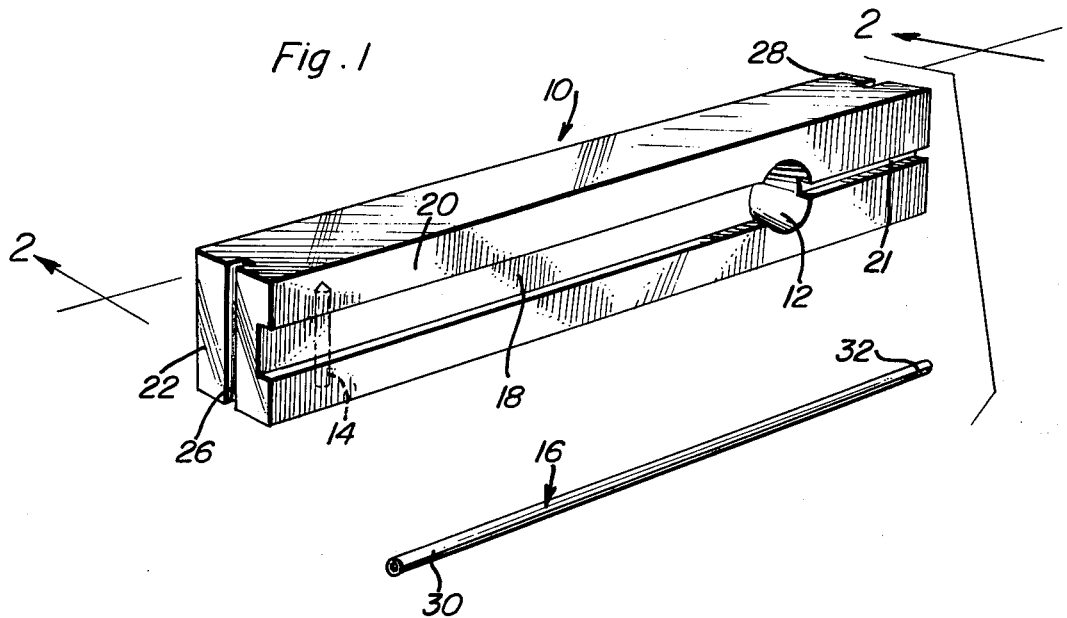
FIG. 1 is an exploded, perspective view showing apparatus according to the present invention for threading worms and the like onto fishhooks.
Figure 2:
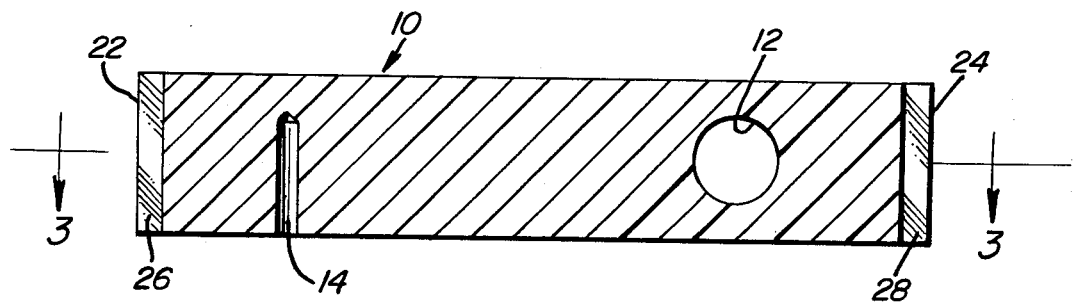
FIG. 2 is an enlarged, sectional view taken generally along the line 2—2 of FIG. 1.
Figure 3:
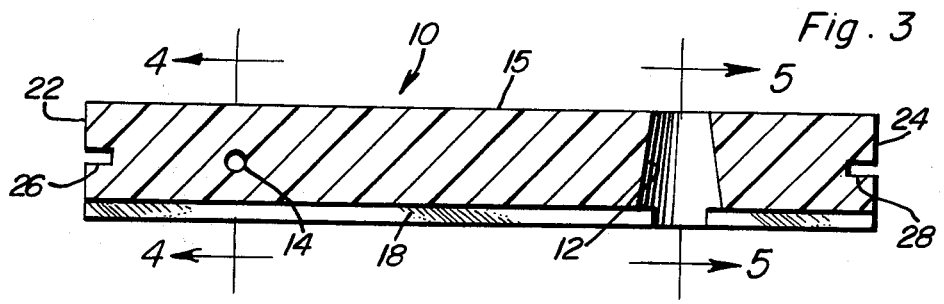
FIG. 3 is a sectional view taken generally along the line 3—3 of FIG. 2.
Figures 4, 5:
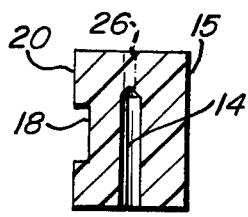
FIG. 4 is a sectional view taken generally along the line 4—4 of FIG. 3.
FIG. 5 is a sectional view taken generally along the line 5—5 of FIG. 3.

Referring now more particular to FIGS. 1 through 5 of the drawings, apparatus according to the invention for threading worms on fishhooks includes a body member 10 provided with a tapered through hole 12 arranged for receiving an end portion of a worm, and also provided with a recess 14 substantially at right angles to hole 12 and longitudinally spaced therefrom. The taper of hole 12 toward a planar bottom side 15 of body member 10 facilitates insertion of a worm into hole 12. A longitudinally extending element preferrably in the form of the illustrated length of tubing 16 is selectively insertable into the worm received in the hole 12 provided in body member 10, and is removably insertable into the recess 14 for a purpose to become clear below.

The body member 10 is in the form of a substantially rectangular block having a longitudinal extent and being provided with a groove 18 of rectangular cross section formed in a planar side 20 of the block. This groove 18 is arranged for receiving the main portion of the worm being threaded, and is disposed such that hole 12 communicates with groove 18 by extending perpendicularly with respect thereto and opening into the bottom of the groove 18. The block formed by body member 10 has longitudinally spaced end surfaces 22 and 24, which end surfaces 22, 24 are provided with slots 26 and 28, respectively, arranged for receiving a length of fishing line, and the like. The hole 12 forms one end of the groove 18 while end surface 22 defines the other end, with a trough 21 being provided in side 20 and arranged extending from hole 12 to end surface 24 for matingly receiving the tubing 16. Slots 26 and 28 are disposed substantially parallel to one another, or lie in a common plane, but extend laterally of the longitudinal extent of groove 18, 21. Recess 14 extends parallel to slots 26, 28 and may be coplanar with the slots 26, 28 if desired.

Tubing 16 has a pair of spaced end portions 30 and 32 with portion 30 being removably insertable into recess 14. End portion 32 forms an open end arranged for receiving a fishhook for a purpose to be described below.

Operation

The sequence of steps employed in threading a worm on a fishhook by using the apparatus according to the present invention will now be described in conjunction with FIGS. 6 through 10 of the drawings.

Figure 6:
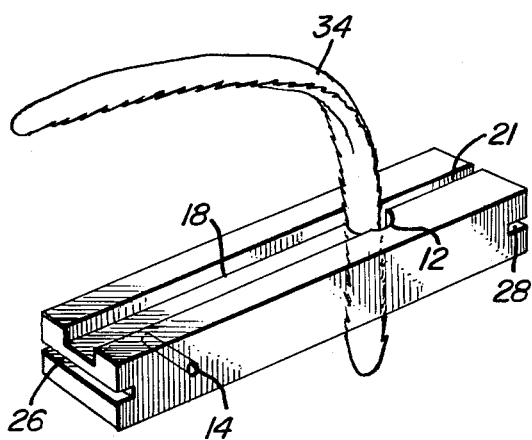
FIGS. 6, 7, 8, 9, and 10 are perspective views showing in sequence the steps involved in threading a worm onto a fishhook by use of apparatus according to the present invention.
Figure 7:
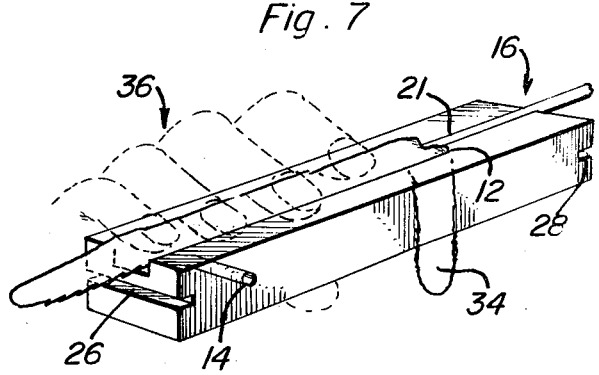
Figure 8:
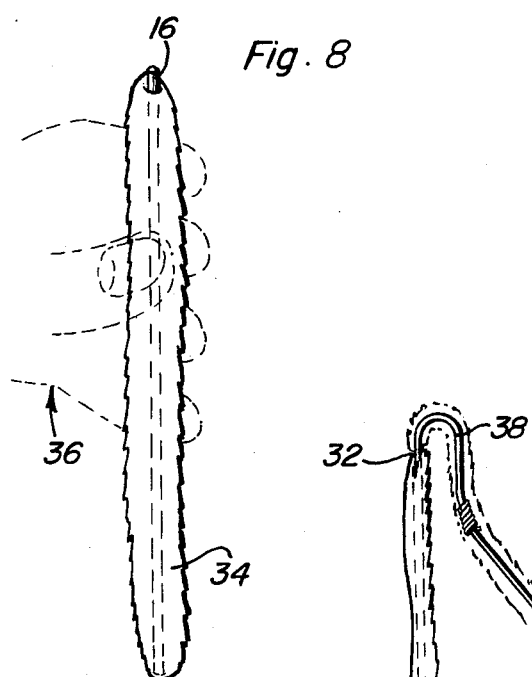
Figure 9:
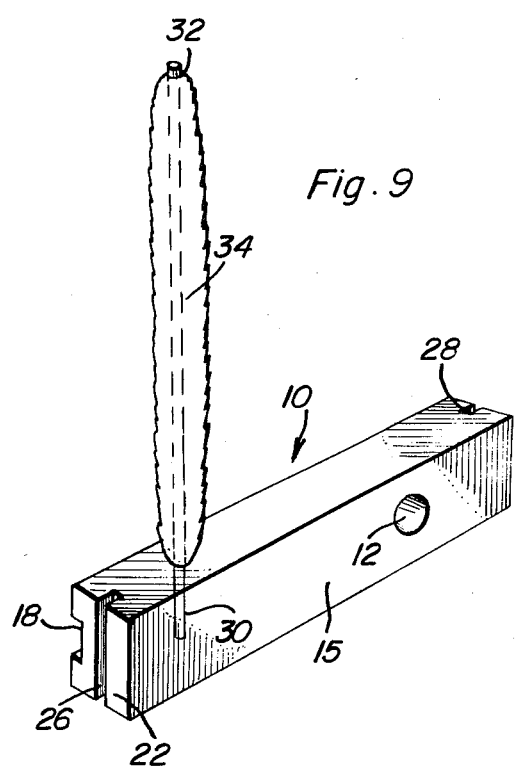

An end portion of a typical worm 34, and the like, is inserted in the tapered hole 12 provided in body member 10, and the remainder of worm 34 is laid out in groove 18 as can be seen from FIGS. 6 and 7. One-half inch to three-quarters of an inch of the worm 34 may be inserted into hole 12. The remainder of the worm 34 is retained in groove 18 by use of the, for example, left hand 36 of the operator as shown in FIG. 7. Tubing 16 is now placed in trough 21 and pushed toward hole 12 so as to break through the skin of worm 34, as is seen in FIG. 7, by axial movement of tubing 16 along the longitudinal extent of trough 21. Tubing 16 is turned back and fourth until it is one inch to one and one-half inches into worm 34. Body member 10 can now be laid aside temporarily and worm 34 and tubing 16 taken again in the left hand 36 as is shown in FIG. 8. The worm 34 and tubing 16 is held in the left hand 36 between the thumb and first finger as shown and the tubing 16 is turned back and forth until all of the worm 34 is one the tubing 16 as seen in FIG. 8.

Figure 10:
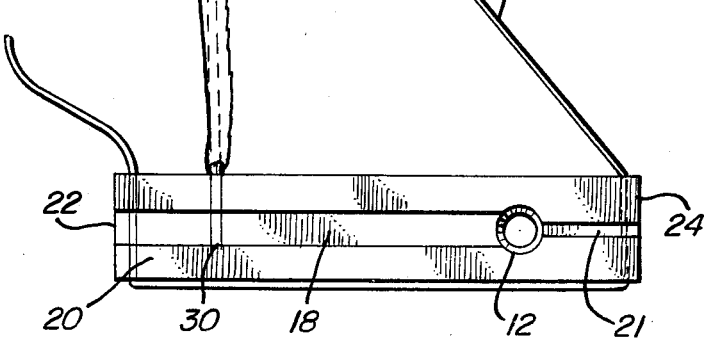

A conventional fishhook 38, and the like, is now engaged in the open end formed by the end portion 32 of tubing 16 and a length of line or leader 40 connected to hook 38 is passed into the slots 26 and 28 provided in the end surfaces 22, 24, respectively, of body member 10 in the manner seen in FIG. 10. That is, line 40 initially passes into slot 28, extends across the bottom surface of body member 10 and passes back upwardly through slot 26 so as to be firmly retained on body member 10. Line 40 and body member 10 are now gripped with the, for example, right hand (not shown) of the operator in order to hold line 40 tight. Then the operator takes the left hand and employs same to slide the worm 34 over hook 38 and onto line 40 to the position shown by the broken lines in FIG. 10.

SUMMARY

As can be readily understood from the above description and from the drawings, worm threading apparatus according to the present invention provides a simple and efficient manner of threading a worm, and the like, onto a fishhook for using the worm as live bait.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for threading worms on fishhooks, comprising, in combination:
   (a) a body member provided with a through hole arranged for receiving a worm, and also provided with a recess; and
   (b) a longitudinally extending element selectively insertable into the worm received in the hole provided in the body member, and removably insertable into the recess provided in the body member, the body member having a longitudinal extent, the body member being further provided with a groove extending along the longitudinal extent of the body member for receiving the worm during insertion of the longitudinally extending element into the worm, with the hole communicating with the groove, the body member having longitudinally spaced end surfaces, with the body member still further provided at the longitudinally spaced end surfaces thereof with slots arranged for receiving a length of fishing line, the slots being disposed substantially parallel to one another and to the grooves, but extending laterally of the groove, with the recess being substantially parallel to and coplanar with the slots, and the body member being further provided with a trough extending from the hole and away from the groove and coplanar therewith for matingly receiving the longitudinally extending element and facilitating insertion of the longitudinally extending element into the worm.

2. Apparatus as defined in claim 1, wherein the body member is a rectangular block having a longitudinal extent, the body member being further provided with a groove extending along the longitudinal extent of the block for receiving the worm during insertion of the longitudinally extending element into the worm, with the hole communicating with the groove.

3. Apparatus for threading worms on fishhooks, comprising, in combination:
   (a) a body member provided with a through hole arranged for receiving a worm, and also provided with a recess; and
   (b) a longitudinally extending element selectively insertable into the worm received in the hole provided in the body member, and removably insertable into the recess provided in the body member, the body member being a rectangular block having a longitudinal extent, the body member being further provided with a groove extending along the longitudinal extent of the block for receiving the worm during insertion of the longitudinally extending element into the worm, with the hole communicating with the groove, the block having longitudinally spaced end surfaces, with the body member still further provided at the longitudinally spaced end surfaces thereof with slots arranged for receiving a length of fishing line, the slots being disposed substantially parallel to one another and to the groove, but extending laterally of the groove, with the recess being substantially parallel to and coplanar with the slots, and the body member being further provided with a trough extending from the hole and away from the groove and coplanar therewith for matingly receiving the longitudinally extending element and facilitating insertion of the longitudinally extending element in the worm.

4. Apparatus as defined in claim 3, wherein the longitudinally extending member is a length of tubing having spaced end portions, one of the end portions of the tubing being removably insertable into the recess provided in the body member, and the other of the end portions of the tubing forming a open end arranged for receiving a fishhook attached to the length of fish line received in the slots.

5. Apparatus for threading worms on fishhooks, comprising, in combination:
   (a) a body member provided with a through hole arranged for receiving a worm, and also provided with a recess; and
   (b) a longitudinally extending element selectively insertable into the worm received in the hole provided in the body member, and removably insertable into the recess provided in the body member, the longitudinally extending member being a length of tubing having spaced end portions, one of the end portions of the tubing being removably insertable into the recess provided in the body member, and the other of the end portions of the tubing forming an open end arranged for receiving a fishhook.

6. A method for threading worms on fishhooks, comprising the steps of:
   (a) inserting a portion of a worm into a hole provided in a body member and retaining the remainder of the worm adjacent a surface of the body member;
   (b) inserting a longitudinally extending element into the worm;
   (c) inserting an end of the longitudinally extending element with the worm on same into a recess provided in the body member;
   (d) engaging a fishhook in a free end of the longitudinally extending element and pulling a length of line connected to the fishhook into a slot provided on the body member for permitting the line to be securely held against the body member; and
   (e) sliding the worm from the longitudinally extending element over the hook and onto the line.

7. A method as set forth in claim 6, wherein step (b) includes the sub-steps of:
   (1) laying the remainder of the worm in a groove provided in the body member so as to extend away from the hole and holding the worm in the groove;
   (2) inserting the longitudinally extending element axially thereof into the worm along the longitudinal extent of the worm while the worm remains in the groove; and
   (3) removing the worm from the groove provided in the body member and slipping the worm entirely onto the longitudinally extending element.

* * * * *